Patented Feb. 22, 1949

2,462,608

UNITED STATES PATENT OFFICE 2,462,608

COUMARONE-INDENE RESIN STABILIZED WITH AN ALKYL POLYHYDROXY SPIRO INDANE

Samuel G. Burroughs, Pittsburgh, Pa., assignor to Pennsylvania Industrial Chemical Corporation, Clairton, Pa., a corporation of Pennsylvania No Drawing. Application January 18, 1945, Serial No. 573,469

4 Claims. (Cl. 260—81)

This invention relates to improvement in coumarone-indene resin polymers; and bears the relation of a continuation-in-part to my application Serial No. 497,039, filed August 2, 1943, which has become abandoned.

A property of coumarone-indene resin which detracts from the utility of the resin as an ingrient of coating compositions is its tendency to discolor, or "yellow." This discoloration takes place very rapidly when the resin forms or is included in a film, such as a paint or varnish film or a protective film for concrete. It is induced by oxidation, and the progress of the oxidation and discoloration is greatly accelerated by subjection to light containing ultra-violet rays. This tendency to discolor, or "yellow," takes place in spite of the care exercised in making the resin, and the phenomenon occurs in coumarone-indene resins of even the greatest purity and lightest initial color. Thus if a coumarone-indene resin of maximum purity and initially a very light yellow color be spread in an apparently colorless film; such film will show a marked yellowish cast after subjection to bright sunlight for only a few days, and the color development will progress to a stage in which the color of the film is a brownish yellow or yellowish brown.

Resort to various expedients has been taken, to inhibit color development in coumarone-indene resin by saturation or partial saturation of the polymeric molecules of the resin. The best known and probably the most effective method of so doing is by hydrogenation. Hydrogenation is an expensive procedure, and because it greatly increases the solubility of the resin is practiced chiefly for uses of the resin in which solubility of the resin in aliphthatic hydrocarbons is a prime requisite.

It is the object of my invention to provide in a manner to render large scale production of the resin commercially practical, a coumarone-indene resin in which color development is prevented, or is reduced to an order in which it does not substantially detract from the value of the resin in coating compositions.

I have discovered that discoloration of coumarone-indene polymers when used alone, or with other ingredients of film-forming compositions, adhesives, elastic or plastic bodies, and the like, may be rendered negligible by including with the coumarone-indene polymers an anti-oxidant of special kind. There is a substantial number of anti-oxidants currently used to prevent, (i. e. to render negligible) oxidation in gasoline and in rubber. Most of such anti-oxidants, such as para-amino phenol, alpha naphthalamine, phenyl beta naphthalamine, benzoylamino phenol, diphenylnaphthalamine, benzoylamino phenol, diphenylamino ethane and the aldehyde amine reaction products are relatively ineffective in preventing discoloration of coumarone-indene polymers. Whereas they serve to retard color development, they do not prevent the resin from obtaining ultimately a color depth almost equal to that reached when anti-oxidants are absent.

I have discovered, however, that the inclusion with coumarone-indene polymers of a small quantity of a particular class of anti-oxidants is effective to prevent color development in the coumarone-indene polymers. This class of anti-oxidants consists of the alkyl polyhydroxy spiro hydroindenes, or in the preferred nomenclature of "Chemical Abstracts" of the American Chemical Society, the alkyl polyhydroxy spiro indanes. Such compounds are characterized by more or less complex structure presenting unsaturated ring nuclei with hydroxyls, and saturated ring structure joining the unsaturated nuclei. These compounds and the methods involved in their preparation are described in various publications, among which are a paper by Fabrinyl and Szeky, Berichte der Deutchen Chemischem Gesellschaft, vol. 38, page 2307 (1905), and in an article by Baker, Journal of Chemical Society (London) 1934, page 1678. Methods involving the use of such compounds to prevent oxidation in rubber, by including with the rubber such anti-oxidants, are disclosed in my Patent No. 2,176,881, issued October 24, 1939.

As exemplary of the alkyl polyhydroxy indanes, I may give 3,3,3',3' tetramethyl 6,6',7,7' tetrahydroxy 1,1' spiro bis-indane; 3,3,3',3' tetramethyl 4,4',5,5', tetrahydroxy 1,1', spiro bis-indane; 3,3,3',3' tetramethyl 5,6,5',6' tetrahydroxy 1,1', spiro bis-indane; 3,3,3',3' tetramethyl 4,5,6,4',-5',6' hexahydroxy 1,1' spiro bis-indane; 3,3,3',-3',5,6,7,5',6',7' hexahydroxy 1,1' spiro bis-indane; 3,3,3',3' tetramethyl 5,5' dihydroxy 6,6' dimethoxy 1,1' spiro bis-indane; 3,3,3',3' tetramethyl 5,5' dimethoxy 6,6' dihydroxy 1,1' spiro bis-indane; 3,3' dimethyl 3,3' diethyl 5,6 diethoxy 5',6' dihydroxy 1,1' spiro bis-indane.

The formula for 3,3,3',3' tetramethyl 5,6,5',6' tetrahydroxy 1,1' spiro bis-indane may be taken as representative. The currently accepted and apparently sound formula for that substance may be given as follows:

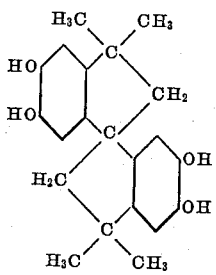

The melting point of the above compound is from 280° C. to 285° C., with some attendant decomposition. Like all the alkyl polyhydroxy indanes, it is soluble in acetone and other ketones, sparingly soluble in low boiling aliphatic solvents, and insoluble in water.

As described in the articles to which reference has been made above, the alkyl polyhydroxy spiro indanes are best prepared by condensing polyhydroxy phenols with ketones in an acid medium, such as an acetic acid-hydrochloric acid mixture. The desired compounds are insoluble in such a medium, and are precipitated as condensation proceeds. The alkyl polyhydroxy indanes for preventing color development in coumarone-indene resin may be prepared by condensing such phenols as catechol, pyro-gallol, phloroglucinol, quinol, and 1,2,4 trihydroxy benzene with such ketones as acetone, methyl-ethyl ketone, methyl-propyl ketone, and ethyl-propyl ketone. If the ketones of higher molecular weight be used, a lesser yield of condensate is had, but such ketones are usable.

I have discovered further that sulphonation products of the alkyl polyhydroxy indanes, and boric acid salts of the alkyl polyhydroxy spiro indanes are similarly effective to prevent color development in coumarone-indene resin.

As exemplary of sulphonation of the alkyl polyhydroxy spiro indanes, I shall take a tetra-methyl 5,5',6,6' tetrahydroxy 1,1' spiro bis-indane. One part by weight of that material was added to 3 parts by weight of 65% oleum (65% SO₃ and 35% H₂SO₄) at 0° C., and was agitated for complete solution therein. Agitation was continued until a small sample, taken out, was soluble in a large amount of water. The reaction product was poured into water and was neutralized with calcium hydroxide.

The mixture was filtered and the filtrate was precipitated by treatment with sodium carbonate until no further precipitation took place. The precipitate was filtered out, and was evaporated under vacuum to obtain the sodium sulphonate of the spiro indane. It is not certain that sulphonation takes place at all four positions 4,7,-4',7', but the following formula for the sulphonated indane is theoretically possible:

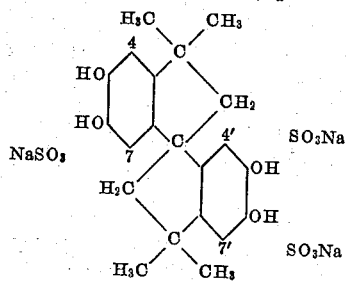

I prepare, also, for use as an anti-oxidant preventing the discoloration of coumarone-indene resin, the metallic or organic base salts of an acid-reacting complex formed by reacting an alkyl polyhydroxy spiro indane with boric acid. The preparation of such alkyl polyhydroxy spiro indane-boric acid salts is exemplified by the following:

An alkyl polyhydroxy spiro indane and an organic base, such as diphenylguanidine are dissolved in equal molecular proportions in acetone with warming. Boric acid is added to the solution in molecular equivalency with the spiro indane, and the mass is warmed. The solid material which is formed is digested with warm water and is filtered. The material thus formed is a fairly stable spiro indane-boric acid salt. This salt is particularly desirable for use in compositions which contain an acid substance with the coumarone-indene resin. This is because the presence of an acid tends to lessen the effectiveness of the alkyl polyhydroxy spiro indanes in preventing discoloration of the coumarone-indene resin, and the boric acid salt of the spiro indane is more capable of resisting the effect of the acid.

To prevent yellowing of the coumarone-indene resin, I include with the coumarone-indene polymers of the resin from about 0.05% by weight of an alkyl polyhydroxy spiro indane material selected from the alkyl polyhydroxy spiro indanes, the sulphonated alkyl polyhydroxy spiro indanes, and the alkyl polyhydroxy indane-boric acid salts. Quantities up to and even in excess of 5% of these substances do not tend to detract from the coherence and other film-forming properties of the resin. It is a fact that the alkyl polyhydroxy spiro indanes are not highly soluble; and that from 3% to 5% is the greatest proportion of them that will remain associated with the polymers of the resin without precipitation from evaporative solvents or incompatibility with non-volatile plasticizers, for the coumarone-indene resin. In most instances, as has been noted, a small quantity of the alkyl polyhydroxy spiro indane materials is adequate to prevent yellowing of a coumarone-indene resin with the polymers of which it is associated. For some purposes, however, alkyl polyhydroxy spiro indanes in excess of 5% the weight of the coumarone-indene polymers usefully may be associated with them as a minor content of the non-yellowing coumarone-indene resin.

With a very pure low molecular weight coumarone-indene resin in solution in a solvent such as mineral spirits, from 0.1% to 0.3% of the spiro indane itself usually is adequate. If, however, the resin should have a perceptible content of phenols, or other acidic content, from 0.1% to 0.3% of the boric acid salt of a spiro indane or at least 0.4% or 0.5% of the spiro-indane itself should be included in the solution. If a solution is to be made of a high molecular weight coumarone-indene resin insoluble in mineral spirits, (which resin is of high purity), and dissolved in a suitable solvent such as high flash solvent naphtha, from 0.05% to 0.2% of the spiro indane itself usually is adequate. In the case of a plastic composition composed of coumarone-indene resin, plasticizing materials and fillers in which one or more of the components additional to the coumarone-indene resin is acidic, from 0.3% to 1.00% of a boric acid salt of the spiro indane desirably is included, and the inclusion of 0.9% or 1.00% of the spiro indane itself is indicated.

If a sulphonated alkyl polyhydroxy spiro indane is used, the proportions of that material desirably included follow very closely the proportions given for the spiro indane itself.

In all the foregoing the proportions of the spiro indane materials are based upon parts by weight of the coumarone-indene polymers in the solution or composition. Customarily the coumarone-indene resin is made up for sale and use as a solution or composition, and in the case of a solution, the spiro indane material is associated with the coumarone-indene resin in the solution. If it is desired, after including the spiro indane material, to distill off the solvent and thus to obtain a solid coumarone-indene resin including the spiro indane, it is necessary to include a substantially greater quantity of the spiro indane material, such as from 2 to 4 times the proportional quantities given above, in order that the prescribed proportion of the spiro indane material will be included in the solid coumarone-indene resin. This is because there is some loss of the spiro indane material during distillation. It appears, however, that the spiro indane material is effective to prevent discoloration of the coumarone-indene resin when used either by associating it with the coumarone-indene polymers in solution, by associating it with the coumarone-indene polymers in a solid or semi-solid composition, or by associating it with the polymers of a solid coumarone-indene resin.

The following examples illustrate the principles of my invention:

*Example No. 1*

A light-colored coumarone-indene resin of low molecular weight melting about 70° C. (ball and ring) was dissolved in an equal weight of mineral spirits. A tetramethyl tetrahydroxy spiro indane in a quantity equal to 0.3% the weight of the coumarone-indene resin was dissolved in acetone and was added to the resin solution. The acetone solution of the spiro indane included a small quantity of the mono-ethyl ether of ethylene glycol, in order to prevent precipitation of the spiro indane. The spiro indane was mixed thoroughly with the coumarone-indene resin solution.

The solution so formed was adapted to film-formation by evaporation of the solvent to leave a film of coumarone-indene resin. Upon formation of such film by evaporation in air, and upon re-dissolution and analysis of the resin forming the film, it was found that most of the spiro indane remained with the resin in the film, there being but slight loss of that material during the course of normal evaporation.

A film of the deposited resin when exposed to ultra-violet light in a "Weathermeter" for 24 hours showed no definitely ascertainable discoloration. Exposure to sunlight for three weeks caused no greater color development in the film. A film of an identical resin solution, but containing none of the spiro indane became very yellow when exposed to bright sunlight for 12 hours.

*Example No. 2*

A light-colored high molecular weight coumarone-indene resin, melting about 130° C. (ball and ring), was dissolved in an equal weight of high flash (coal tar) solvent naphtha. A di-ethoxy-dihydroxy-dimethyl-diethyl spiro indane was added in acetone solution in a quantity equal to 0.15% the weight of the coumarone-indene polymers in solutions. The spiro-indane was mixed thoroughly with the coumarone-indene resin solution.

A film of resin deposited from the solution by evaporation of the solvent was exposed to ultra-violet light in a "Weathermeter" for 24 hours. Exposure to sunlight for three weeks caused no greater color development in the film. After such exposure, the film was but very slightly colored.

*Example No. 3*

A light-colored coumarone-indene resin of low molecular weight, melting about 60° C. (ball and ring), was dissolved in ⅓ its weight of mineral spirits and an emulsion was formed by agitation with a small amount of triethanolamine-oleic acid soap. There was agitated with this emulsion tetrahydroxy tetramethyl spiro indane sodium sulphonate in a quantity equal to 0.2% the weight of the coumarone-indene polymers in the solution. The emulsion was diluted with an equal volume of water and was allowed to stand in a bottle exposed to sunlight. After a period of 3 weeks, no discoloration was detectable.

*Example No. 4*

A plastic composition was made up composed 25 parts by weight of low molecular weight coumarone-indene resin melting about 60° C. (ball and ring), 25 parts by weight blown soya bean oil, and 50 parts by weight of precipitated calcium carbonate. To this composition there was added tetrahydroxy tetramethyl spiro indane borate (urea salt) in a quantity equal to 0.4% the weight of the coumarone-indene resin in the composition. The mass was mixed well, was plastered on a slide, and was exposed to sunlight. After an exposure of 30 days, there was but very slight discoloration.

*Example No. 5*

With the same plastic composition as in Example No. 4, there was added 1.0% of tetramethyl tetrahydroxy spiro indane. As in Example No. 4, the mass was mixed well, was plastered on a slide, and was exposed to sunlight. After exposure for 30 days, there was a relatively slight discoloration, which discoloration was more marked than in the material of Example No. 4, but was strikingly less than that which took place in a composition containing the same ingredients, save that no spiro indane material was included in association with the polymers of the coumarone-indene resin.

*Example No. 6*

A light-colored coumarone-indene resin of low molecular weight, melting about 70° C. (ball and ring) was dissolved in an equal weight of mineral spirits. A tetramethyl tetrahydroxy spiro indane in a quantity equal to 0.6% the weight of the coumarone-indene resin was dissolved in acetone and was added to the resin solution. The acetone solution of the spiro indane included a small quantity of the mono-ethyl ether of ethylene glycol in order to prevent precipitation of the spiro indane. The spiro indane was mixed thoroughly with the coumarone-indene resin solution.

The solution so formed was subjected to distillation with steam, care being taken to utilize a temperature no greater than required to distill off the solvent. The solid coumarone-indene resin was recovered.

Upon analysis the solid coumarone-indene resin was found to contain about 0.3% of the spiro indane. Upon re-dissolution in mineral spirits and upon deposition of the resin in a film, the film was found to possess the same resistance to yellowing that was possessed by the film deposited from the solution of coumarone-indene polymers in association with the spiro indane made in accordance with the procedure of Example No. 1.

*Example No. 7*

A light-colored coumarone-indene resin of high molecular weight, melting about 130° C. (ball and ring) was fused. With this fused resin there was mixed tetramethyl tetrahydroxy spiro indane in a quantity equal to 0.6% the weight of the resin. 50 parts by weight of the resin were worked up with 20 parts by weight of dibutyl phthalate and 30 parts by weight of white (titanium oxide) pigment. The mass thus formed when exposed to ultra-violet light in a "Weathermeter" for 48 hours developed only slight discoloration.

*Example No. 8*

A low molecular weight coumarone-indene resin, melting about 60° C. (ball and ring), was fused, and tetramethyl tetrahydroxy spiro indane borate in a quantity equal to 0.4% the weight of the coumarone-indene resin was worked thoroughly into the body of the resin. 25 parts by weight of this treated coumarone-indene resin was mixed with 25 parts by weight of blown soya bean oil, and 50 parts by weight of precipitated calcium carbonate.

This composition appeared in its resistance to discoloration and in all other properties closely similar to the composition made by bringing the spiro indane into association with the coumarone-indene polymers in accordance with the procedure of Example No. 4.

It is correct to say any member of the group consisting of the alkyl polyhydroxy spiro indane materials above disclosed, namely the alkyl polyhydroxy spiro indanes themselves, the sulphonated alkyl polyhydroxy spiro indanes, and the boric acid salts of the alkyl polyhydroxy spiro indanes, when associated with the polymers of coumarone-indene resin prevent yellowing of the resin. That is, they not only greatly retard yellowing, but prevent permanently what may be considered the normal color development of each individual coumarone-indene resin. It is to be understood that the foregoing examples are exemplary only of the ways in which the specified spiro indanes can be associated effectively with the polymers of coumarone-indene resin.

Where proportions may have been stated without qualification throughout the foregoing specification, such proportions are to be taken as in parts by weight, and where throughout the specification melting point of resins has been given without qualification, that melting point is to be taken as by the ball and ring method of melting point determination for resins.

I claim as my invention:

1. A non-yellowing coumarone-indene resin composition consisting of coumarone and indene polymers and an alkyl polyhydroxy spiro indane material selected from the group consisting of the alkyl polyhydroxy spiro indanes, the sulphonated alkyl polyhydroxy spiro indanes and the boric acid salts of the alkyl polyhydroxy spiro indanes, the said alkyl polyhydroxy spiro indane material being present in a quantity approximately equal to from 0.05% to 5.00% the combined weight of the coumarone and indene polymers.

2. A non-yellowing coumarone-indene resin composition consisting of coumarone and indene polymers and an alkyl polyhydroxy spiro indane in a quantity approximately equal to from 0.05% to 5.00% the combined weight of the coumarone and indene polymers.

3. A non-yellowing coumarone-indene resin composition consisting of coumarone and indene polymers and a sulphonated alkyl polyhydroxy spiro indane in a quantity approximately equal to from 0.05% to 5.00% the weight of the coumarone-indene polymers.

4. A non-yellowing coumarone-indene resin composition consisting of coumarone and indene polymers and an alkyl polyhydroxy spiro indane-boric acid salt in a quantity equal to from 0.05% to 5.00% the weight of the coumarone-indene polymers.

SAMUEL G. BURROUGHS.

REFERENCES CITED

The following references are of record in the file of this patent:

UNITED STATES PATENTS

| Number | Name | Date |
|---|---|---|
| 2,139,722 | Carmody | Dec. 13, 1938 |
| 2,176,881 | Burroughs | Oct. 24, 1939 |
| 2,176,882 | Fisher | Oct. 24, 1939 |
| 2,176,883 | Fisher | Oct. 24, 1939 |